United States Patent [19]

Holland

[11] Patent Number: 4,524,800

[45] Date of Patent: Jun. 25, 1985

[54] ONE-WAY BRAKE BLEEDER CHECK VALVE WITH SEALING CAP

[75] Inventor: Marion D. Holland, Louisville, Ky.

[73] Assignee: Robert E. Robbins, Elizabethtown, Ky.

[21] Appl. No.: 609,950

[22] Filed: May 14, 1984

[51] Int. Cl.³ .................. F16K 15/18; F16K 31/58
[52] U.S. Cl. .................. 137/516.27; 137/DIG. 2; 251/347; 251/348; 251/354
[58] Field of Search ............ 137/539, DIG. 2, 516.25, 137/516.27; 251/341, 347, 348, 349, 350, 351, 352, 353, 354

[56] References Cited

U.S. PATENT DOCUMENTS

| | | | |
|---|---|---|---|
| 816,006 | 3/1906 | Duryea | 251/354 |
| 1,254,716 | 1/1918 | Madeksho | 251/351 |
| 1,275,783 | 8/1918 | Steinmetz | 251/348 |
| 1,521,081 | 12/1924 | Dooling | 251/354 |
| 1,564,507 | 12/1925 | Barker | 137/539 |
| 1,706,070 | 3/1929 | Methudy | 251/348 |
| 2,175,718 | 10/1939 | Litle, Jr. | 137/DIG. 2 |
| 2,688,300 | 9/1954 | Works | 137/516.25 |

*Primary Examiner*—Alan Cohan
*Assistant Examiner*—John A. Rivell
*Attorney, Agent, or Firm*—Richard L. Caslin

[57] ABSTRACT

A one-way brake bleeder check valve is shown for use in bleeding entrapped air from the hydraulic wheel brake cylinders of automobiles and the like. This brake bleeder valve has a one-piece valve body that is mounted as a permanent part of a wheel brake cylinder. This valve body includes a longitudinal passage with a first section having its innermost end provided with a recessed valve seat. A second section of the passage is of larger diameter for receiving an adjustable valve sealing cap by means of a threaded connection. Positioned within the second section is a valve element for cooperation with the said recessed valve seat. The sealing cap has an innermost end provided with a second recessed valve seat in cooperation with a longitudinal passage through the cap that includes a compression spring that normally bears on the valve element to seal the valve element against the first recessed valve seat. When the valve sealing cap is closed the valve element is in sealing engagement with both the first recessed valve seat and the second recessed valve seat so that no air can become entrapped between the valve element and the sealing cap.

4 Claims, 3 Drawing Figures

ONE-WAY BRAKE BLEEDER CHECK VALVE WITH SEALING CAP

BACKGROUND OF THE INVENTION

1. Field of the Invention

This invention relates to fluid valves, and particularly one-way brake bleeder check valves for draining entrapped air or gasses from a vehicle hydraulic wheel break system. By use of the present invention, it is possible for one person to bleed the entire brake system through the individual wheel cylinders of all four wheels simultaneously.

2. Description of the Prior Art

For many years, it has required a minimum of two people in order to bleed the brake system of hydraulic fluid in order to eliminate any air or gasses present in the system. Usually, one person sits in the car, behind the steering wheel, and operates the brake pedal upon command from the other person who is working under the car to open and close the bleeder valves that are furnished with each wheel cylinder. It has been a desired objective for many years to devise a brake system that requires but one person to bleed the hydraulic brake system of the unwanted air or gasses.

An early patent is to Gary et al U.S. Pat. No. 2,069,606 which describes a bleeder valve that is furnished with a one-way ball check valve, which check valve prevents air from being drawn in through the discharge end of the bleeder valve when the brake pedal is released. This patent also has a modification that includes the addition of an outlet valve associated with a pipeline leading from the one-way bleeder valve, where this outlet valve serves to release any accumulated air that is present in the hydraulic fluid, thereby eliminating any possibility of the accumulated air returning into the hydraulic brake system.

The Legerski U.S. Pat. No. 2,611,387 describes a valved tool for bleeding brake cylinders. This patent teaches the use of a flexible hose that is connected to the standard bleeder valve, and the free end of the hose is supplied with a small, portable tool having a hollow body formed by a pair of mating cylindrical parts having two ball check valves that are held closed by a common compression spring with a single discharge opening located between the two check valves. The reason for the two ball check valves is that the tool may be used in one direction for use with standard automobiles, and then it could be used in a reverse position for use with larger vehicles, such as trucks, airplanes and the like.

The Wilson U.S. Pat. No. 2,771,093 describes a bleeder valve for hydraulic brake systems, where the bleeder valve has a one-way check valve for preventing the entrance of air into the system during the time the bleeder valve is open and while fluid and air is passing therethrough. This bleeder valve having a one-way check valve is also a one person brake bleeder system. A drain hose is shown connected to this bleeder valve for discharging into a suitable receptacle. Also, this patent shows a dust plug that is removably retained within the outlet bore of the valve to ensure that no foreign matter will enter the bore when the bleeder valve is not in use.

The Pagano U.S. Pat. No. 3,050,080 describes a bleeder valve having a pair of ball check valves that are held closed by a common intermediate compression spring. The purpose of the outermost check valve is to prevent foreign matter from entering into this one-way check valve.

The Berg U.S. Pat. No. 4,149,560 describes a one-way check valve that may be releasably attached to the bleeder valve of a wheel brake cylinder. This one-way bleeder valve has a quick disconnect in the form of a rubber casing or jacket that fits over the one-way check valve and is capable of snapping over the external fitting of the bleeder valve.

OBJECTS OF THE PRESENT INVENTION

The principal object of the present invention is to provide a one-way brake bleeder check valve with a valve sealing cap that causes the valve element to seal with a first recessed valve seat as well as with a second recessed valve seat formed as part of the sealing cap so that no air is trapped between the valve element and the cap.

A further object of the present invention is to provide a one-way brake bleeder check valve of the class described, where this brake bleeder valve is mounted stationary with respect to the wheel cylinder in a sealed condition so that air may not leak around the threads that support the brake bleeder check valve with respect to the wheel cylinder.

A further object of the present invention is to provide a one-way brake bleeder check valve with a valve sealing cap that renders the internal valve element immobile when the sealing cap is in its fully closed position.

SUMMARY OF THE INVENTION

The present invention provides a one-way brake bleeder check valve for use as a permanent part of a hydraulic brake system for bleeding air and gasses from the wheel brake cylinders. The valve has a unitary valve body that is mounted on each wheel brake cylinder, and the body has a longitudinal passage with an inlet at one end and an outlet at the second end. The passage has a first section adjacent the inlet end and a second section adjacent the outlet end, where the second section is of larger diameter than the first section. The innermost end of the first section is furnished with a recessed valve seat for cooperation with a valve element located within the second section. An adjustable valve sealing cap is mounted at the outlet end of the through passage, and this cap has an innermost end with a second recessed valve seat for sealing engagement with the valve element. The second section of the passage includes a compression spring acting upon the valve element for normally holding the valve element closed with respect to the first recessed valve seat, whereby the closing of the valve sealing cap will create a double sealing action between the valve element and both recessed valve seats.

BRIEF DESCRIPTION OF THE DRAWINGS

This invention will be better understood from the following description taken in conjunction with the accompanying drawings, and its scope will be pointed out in the appended claims.

DESCRIPTION OF THE PREFERRED EMBODIMENTS

Figure 1:
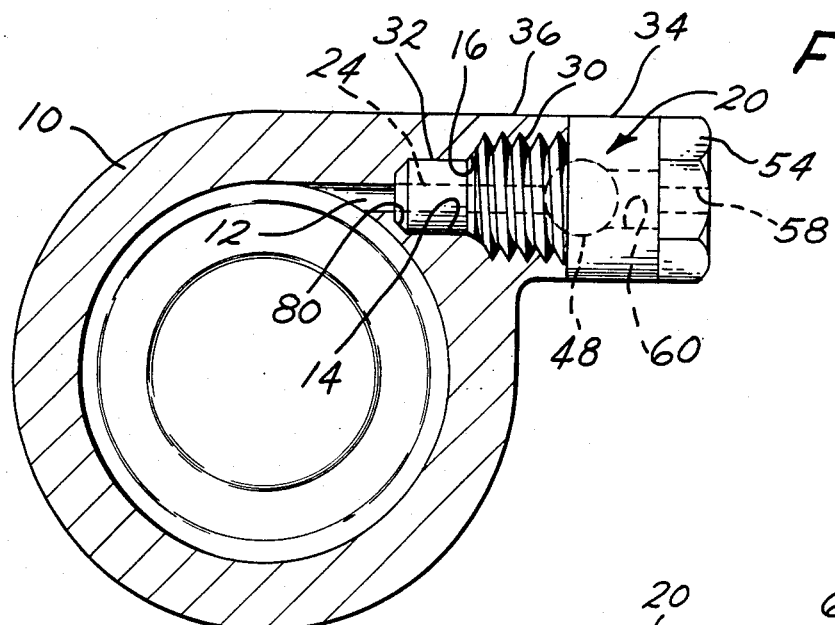
FIG. 1 is a transverse, cross-sectional view of a fragment of a hydraulic wheel brake cylinder to which is installed the one-way brake bleeder check valve of the present invention, which check valve is shown in full lines.

Turning now to a consideration of the drawings, and, in particular, to the transverse, cross-sectional view of a fragment of a hydraulic wheel brake cylinder 10, as seen in FIG. 1, there is shown a tangential bleeder hole 12 which converts to an enlarged cylindrical section 14 and a still larger internally threaded section 16, where both sections 14 and 16 are for receiving one end of the brake bleeder check valve 20 of the present invention.

Figure 3:
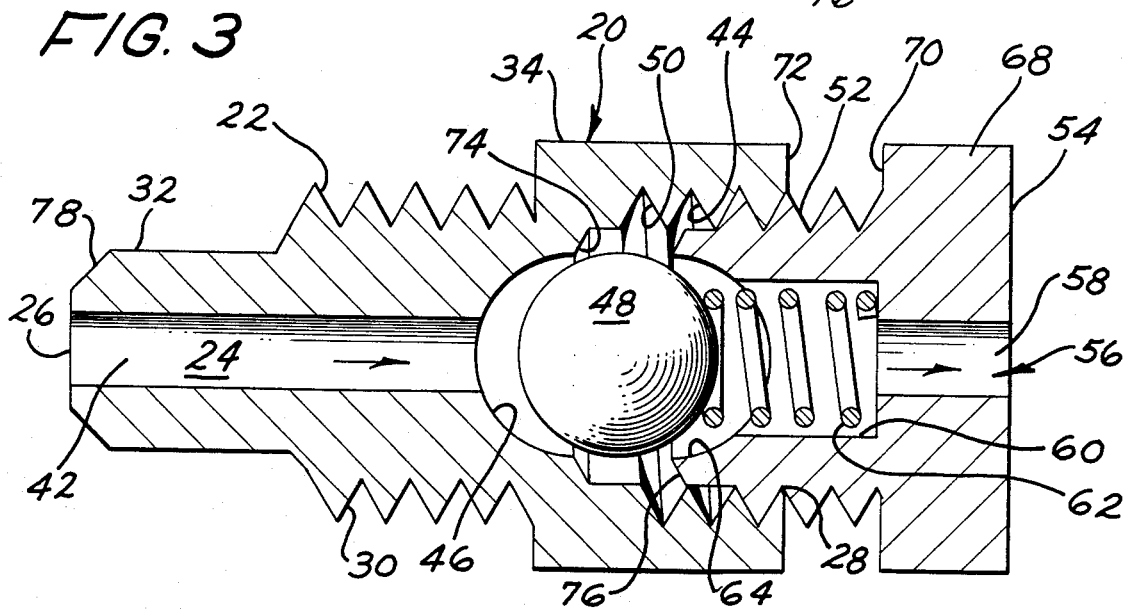
FIG. 3 is a cross-sectional view of the brake bleeder check valve, similar to that of FIG. 2, except the adjustable valve sealing cap at the right end of the valve body has been loosened, and the ball check valve is shown in *an opened position which indicates that fluid flow is present moving through the valve body from the inlet end at the left through to the outlet end at the right.*

This brake bleeder check valve 20 can best be understood in the opened position of the valve as illustrated in FIG. 3. This brake bleeder check valve 20 has a unitary valve body 22 with a central longitudinal passage 24 therethrough. This valve body passage 24 has an inlet 26 at the left end and an outlet 28 at the opposite end. Intermediate the valve body 22 are formed external threads 30 for making threaded engagement with the internal threads 16 of the wheel brake cylinder 10. The inlet end of the valve body 22 has a cylindrical section 32 for plugging up the cylinder section 14 of the wheel brake cylinder 10, as is best seen in FIG. 1. The right outlet end of the valve body 22 has an enlarged cylindrical section 34 which conforms to the adjacent configuration 36 of the wheel brake cylinder 10.

Figure 2:
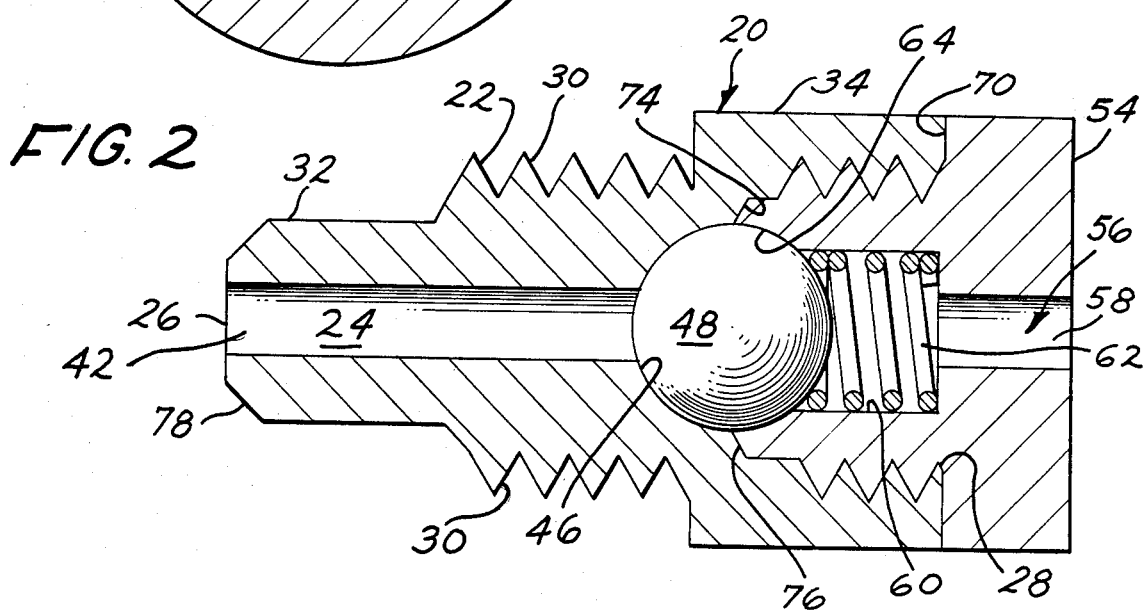
FIG. 2 is an enlarged cross-sectional view of the brake bleeder check valve of FIG. 1 shown cut along the longitudinal axis thereof, where this check valve is set in a closed or sealed position.

As best seen in FIG. 3, the longitudinal passage 24 has a first inlet section 42 and a second section 44 of larger diameter. The innermost end of the first section 42 of the longitudinal passage 24 is furnished with a recessed valve seat 46 for making a mating engagement with a ball valve element 48 that is positioned within the second section 44 of the passage 24. This mating engagement is best seen in FIG. 2, when the brake bleeder check valve is in its closed position. The second section 44 of the passage is provided with internal threads 50 for making threaded engagement with external threads 52 of a valve sealing cap 54. This valve sealing cap 54 is tubular in nature, having a longitudinal passage 56, with a first outlet section 58 and a second enlarged section 60 for receiving a compression spring 62 that bears against the ball valve element 48 and normally holds this element closed against the first recessed valve seat 46. The innermost end of this second section 60 of the passage 56 is formed with a second recessed valve seat 64 for making a mating engagement with the ball valve element 48, again as best seen in the closed position of FIG. 2.

Thus, when a person wishes to bleed the brake fluid so as to remove all air and gasses, he merely needs to loosen the valve sealing cap 54 to a position somewhat as shown in FIG. 3. The compression spring 62 will hold the ball valve element 48 closed against the first recessed valve seat 46. When the person depresses the brake pedal, the fluid pressure will build up to overcome the action of the compression spring 62 and cause the ball valve element 48 to open, and when the person removes his foot from the brake pedal, the compression spring 62 will return the ball element to its sealing position against the first recessed valve seat 46. All fluid leaving the wheel brake cylinder will pass through the passage 56 of the valve sealing dcap 54. Then, when the person wishes to seal all of the wheel brake cylinders, he will merely tighten the valve sealing cap 54 until the ball valve element 48 is sealed with respect to both the first recessed valve seat 46 and the second recessed valve seat 64, as is clearly illustrated in FIG. 2. The valve sealing cap 54 has an enlarged head 68 which has a six-sided external configuration for engagement by a crescent wrench, or the like, to gain a strong grip on the cap. Moreover, this head 68 of the cap has a sealing face 70 for engagement with a mating sealing face 72 adjacent the outlet end 28 of the valve body 22.

Moreover, the first recessed valve seat 46 is provided with a larger peripheral edge 74 that surrounds the ball valve element 48 in the closed position of FIG. 2, and this peripheral edge 74 is adapted to seal with respect to a larger peripheral edge 76 that surrounds the second recessed valve seat 64. Hence, these two peripheral edges 74 and 76 are sealing edges when the valve sealing cap 54 is closed into sealing engagement with the ball valve element 48, as is best illustrated in FIG. 2.

Having described above my invention of a novel one-way brake bleeder check valve to enable one person to bleed the brake fluid of all air and gasses, it will readily be apparent to those skilled in this art that this invention allows no air or gasses to be trapped between the ball valve element 48 and the valve sealing cap 54. Moreover, this brake bleeder check valve is a permanent part of the hydraulic brake cylinder system, in that this brake bleeder check valve 20 need not be opened by turning the valve body with respect to the internal threads 16 of the bleeder hole 12 of the wheel brake cylinder 10. While I have shown this brake bleeder check valve 20 as a threaded member joined to the wheel brake cylinder 10, it will readily be apparent to those skilled in this art that this brake bleeder check valve 20 could be cast with respect to the wheel brake cylinder 10 by the original equipment manufacturer so that this brake bleeder check valve 20 is not a separate element from the wheel brake cylinder 10. One important advantage of the present invention is that air cannot pass around the threads 30 and the internal thread 16 of the wheel brake cylinder since the inlet end 26 of the valve body 22 is tapered as at 78, as best seen in FIG. 2, for sealing engagement with a mating surface 80 of the bleeder hole 12 of the wheel brake cylinder 10, as best seen in FIG. 1. A primary advantage of the present invention is that when the valve sealing cap 54 is closed, the ball valve element 48 is held immobile and this shuts off the system. In the prior art, the ball check valve is acted upon only by a compression spring, and this causes sponginess in the brake pedal because of air in the bleeder chamber that allows the ball valve to move.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A one-way brake bleeder check valve for use as a permanent part of a hydrualic brake system for bleeding air from wheel brake cylinders on wheeled vehicles, said valve comprising:

a. a unitary one-piece valve body having a longitudinal passage therethrough, with an inlet at the first end of the body and an outlet at the second end;
b. the first inlet end having external threads that are adapted to be threaded into communication with a hydraulic wheel brake cylinder;
c. said passage having a first section extending inwardly from said first inlet end, and being furnished with a recessed valve seat at its innermost end, said passage having a second section of larger diameter extending from the recessed valve seat to the said second outlet end;
d. and a ball valve positioned within the second section adjacent the recessed valve seat, said second section having internal threads;
e. an adjustable valve sealing cap having external threads for threaded engagement with the threads of the second section of the passage through the valve body, the innermost end of the valve sealing cap having a recessed valve seat similar to the first said recessed valve seat for a double sealing action between the ball valve and the first recessed valve seat and the ball valve and the second recessed valve seat, the valve sealing cap having a longitudinal passage where the passage is enlarged adjacent the innermost end of the valve sealing cap for receiving a compression spring that exerts a force against the ball valve and would normally hold the ball valve closed with respect to the first recessed valve seat;
f. wherein the larger peripheral edge of the first recessed valve seat is adapted to seal with respect to the larger peripheral edge of the second recessed valve seat when the valve sealing cap is closed into sealing engagement with the ball valve and the ball valve is in sealing engagement with the first recessed valve seat.

2. The invention as recited in claim 1 wherein the valve sealing cap has an enlarged head on its outermost end for sealing engagement with the second outlet end of the valve body when the ball valve is sealed both with respect to the first recessed valve seat and with respect to the second recessed valve seat.

3. For use with a hydraulic wheel brake cylinder of the brake system for wheeled vehicles, a one-way brake bleeder check valve having an elongated valve body with a longitudinal passage therethrough that has an inlet at the first end of the body and an outlet at the second end;
   a. said passage having a first section extending inwardly from said first inlet end and being furnished with a recessed valve seat at its innermost end, said passage having a second section of larger diameter extending from the recessed valve seat to the said second outlet end;
   b. and a valve element positioned in the second section of the passage adjacent the recessed valve seat, and internal threads formed in the said second section;
   c. and an adjustable valve sealing cap having external threads for mating engagement with the threads in the second section of the passage, the innermost end of this adjustable valve sealing cap having a second recessed valve seat for sealing engagement with the valve element when the sealing cap is closed, said sealing cap including a longitudinal passage that is fitted with a compression spring normally bearing upon the said valve element for urging the valve element into a closed sealing engagement with the said first recessed valve seat, whereby when the valve sealing cap is closed the valve element is sealed with respect to both the first recessed valve seat and the second recessed valve seat;
   d. wherein the said first recessed valve seat has a tapered peripheral edge, and the said second recessed valve seat also has a mating tapered peripheral edge that is adapted to seal with respect to the said first tapered peripheral edge when the valve sealing cap is closed into sealing engagement with the valve element and the valve element is in sealing engagement with the first recessed valve seat.

4. The invention as recited in claim 3 wherein the valve sealing cap has an enlarged head on its outermost end with a mating sealing face for sealing engagement with the second outlet end of the bleeder check valve when the valve element is sealed both with respect to the first recessed valve seat and with respect to the second recessed valve seat, as well as the tapered peripheral sealing surfaces being sealed to the outside of the valve element.

* * * * *